(12) United States Patent
Bonnet (10) Patent No.: US 7,757,029 B2
(45) Date of Patent: Jul. 13, 2010

(54) ON THE FLY CONFIGURATION OF ELECTRONIC DEVICE WITH ATTACHABLE SUB-MODULES

(75) Inventor: Thierry Jean Claude Andre Bonnet, Geneva (CH)

(73) Assignee: ST-Ericsson SA, Plan-les-Ouates (CH)

( * ) Notice: Subject to any disclaimer, the term of this patent is extended or adjusted under 35 U.S.C. 154(b) by 572 days.

(21) Appl. No.: 10/492,566

(22) PCT Filed: Oct. 14, 2002

(86) PCT No.: PCT/IB02/04229

§ 371 (c)(1),
(2), (4) Date: Apr. 14, 2004

(87) PCT Pub. No.: WO03/034202

PCT Pub. Date: Apr. 24, 2003

(65) Prior Publication Data

US 2006/0090109 A1    Apr. 27, 2006

(30) Foreign Application Priority Data

Oct. 17, 2001   (EP) .................................. 01124735

(51) Int. Cl.
*H05K 7/10* (2006.01)
(52) U.S. Cl. .................. 710/301; 710/302; 714/727; 324/763; 702/117; 702/118

(58) Field of Classification Search ......... 710/301–302; 714/726, 727, 728, 729; 324/757, 763; 702/117, 702/118

See application file for complete search history.

(56) References Cited

U.S. PATENT DOCUMENTS 4,135,240 A  *  1/1979  Ritchie ....................... 711/164

(Continued)

FOREIGN PATENT DOCUMENTS

JP        07-98686 A        4/1995

OTHER PUBLICATIONS

IEEE, Inc. IEEE Standard for a Mixed-Signal Test Bus. Jun. 26, 1999.*

(Continued)

*Primary Examiner*—Mark Rinehart
*Assistant Examiner*—Matthew D Spittle
(74) *Attorney, Agent, or Firm*—Robert Iannucci; Seed IP Law Group PLLC (57) ABSTRACT

Electronic device (10) comprising a control unit (11), a plurality of slots (15) for attaching/connecting sub-modules (12, 13), and means (15, 16, 17) for interconnecting the control unit (11) with those sub-modules (12, 13) that are attached/connected to the slots (15). The control unit (11) is capable of issuing commands in order to put the sub-modules (12, 13) in a by-pass mode, to read identification information from sub-modules (12, 13), write parameters into and/or read parameters from at least one of the sub-modules (12, 13), and to re-check whether the configuration of the electronic device (10) has changed by adding or removing a sub-module (12, 13).

7 Claims, 6 Drawing Sheets

U.S. PATENT DOCUMENTS

| | | | | |
|---|---|---|---|---|
| 5,132,635 | A * | 7/1992 | Kennedy | 324/763 |
| 5,325,368 | A | 6/1994 | James et al. | |
| 5,544,309 | A * | 8/1996 | Chang et al. | 714/30 |
| 5,572,141 | A * | 11/1996 | Hutton | 324/757 |
| 5,584,030 | A * | 12/1996 | Husak et al. | 713/300 |
| 5,617,081 | A * | 4/1997 | Madnick et al. | 710/302 |
| 5,617,430 | A * | 4/1997 | Angelotti et al. | 714/726 |
| 5,852,617 | A | 12/1998 | Mote, Jr. | |
| 5,898,704 | A | 4/1999 | Kawano | |
| 5,935,228 | A | 8/1999 | Shinomura | |
| 6,000,051 | A | 12/1999 | Nadeau-Dostie et al. | |
| 6,311,242 | B1 * | 10/2001 | Falkenburg et al. | 710/301 |
| 6,353,905 | B1 * | 3/2002 | Noguchi | 714/728 |
| 6,363,452 | B1 | 3/2002 | Lach | |
| 6,522,985 | B1 * | 2/2003 | Swoboda et al. | 702/117 |
| 6,529,987 | B1 | 3/2003 | Reid | |
| 6,901,344 | B2 * | 5/2005 | Mantey et al. | 702/122 |
| 6,975,752 | B2 * | 12/2005 | Dixon et al. | 382/132 |

OTHER PUBLICATIONS

Sun Microelectronics. microSPARC-IIep—Introduction to JTAG Boundary Scan. White Paper. Jan. 1997.*
IEEE. IEEE Standard Test Access Port and Boundary-Scan Architecture. 2001.*
Domain Technologies. ZSP-USB-JTAG Emulator. Users Guide. Version 2.3. Jul. 2007.*
Digilent. Digilent Adept Suite. User's Manual. Nov. 30, 2006.*
Altera. Using Command-Line Jam STAPL Solution for Device Programming. Application Note 425. Version 1.1. Dec. 2006.*
Cousineau et al., "Design of a JTAG Based Run Time Reconfigurable System," IEEE Comput. Soc., Los Alamitos, CA, 1999, 2 pgs.

* cited by examiner

Fig.7B ers and similar systems have
ON THE FLY CONFIGURATION OF ELECTRONIC DEVICE WITH ATTACHABLE SUB-MODULES The present invention concerns the automatic configuration of electronic devices which can be extended or modified by attaching sub-modules. In particular, portable electronic devices are concerned.

There are many electronic devices that can be extended, modified, or adapted according to needs by attaching sub-modules. In particular handheld devices and consumer devices could be made more attractive when offering the option to expand a basic system or when enabling the user to add features that go beyond what the device offers in its basic configuration.

A handheld phone, e.g. a GSM phone, can for example be modified by allowing to add an MP3 feature or a radio tuner, just to give two examples. Most personal digital assistants (PDAs) have very small keyboards. If it would be possible to attach a larger keyboard when needed, the PDA could almost be used like a regular personal computer. One could likewise add multimedia capabilities by allowing to attach a camera, or some speakers, for example.

A key issue is the re-configuration that becomes necessary whenever a sub-module is plugged in or removed. The reconfiguration has to be straight forward and reliable so that it can be carried out by the user without having to read a manual first. Some personal computers and similar systems have what is called a plug-and-play feature. Plug-and-play basically means that a module (e.g., a PCI adapter card, peripheral device or the like) can be plugged in without having to worry about hardware and software configuration issues. The computer is able to detect a new module and to automatically embed it in the given environment.

JTAG is a protocol that is specifically designed and used for integrated circuit (IC) or board testing. Details of JTAG are defined in the IEEE standard 1149.1-1990. Basically, a JTAG implementation comprises a JTAG-master (also called JTAG controller) and at least one JTAG slave. The JTAG master issues JTAG instructions to control and test the JTAG slave.

To the best of our knowledge, there are currently no protocols for automated configuration of electronic devices with insertable or removable sub-modules.

It is thus an objective of the present invention to provide electronic devices that can be enhanced/modified by attaching sub-modules, whereby the configuration is carried out automatically.

It is thus an objective of the present invention to provide a method for automatic configuration of electronic devices after a sub-module was attached or removed.

According to the present invention, the standard JTAG protocol (a protocol that was designed for IC or board testing) is used for configuration purposes. The JTAG protocol is used in order to automatically configure an electronic device comprising a control unit and a plurality of slots for attaching/connecting sub-modules. The configuration is carried out by reading identification information from the sub-modules, by writing and/or reading parameters into one or more of the sub-modules, by re-checking the configuration of the electronic device from time-to-time to detect whether the configuration has changed, and by repeating some or all of the above steps in case a change in the configuration was detected.

An apparatus in accordance with the present invention comprises a control unit, a plurality of slots for attaching/connecting sub-modules, and means for interconnecting the control unit with those sub-modules that are attached/connected to the slots. The control unit is capable of issuing commands in order to put the sub-modules in a by-pass mode, to read identification information from sub-modules, to write parameters into and/or read parameters from at least one of the sub-modules, and to re-check whether the configuration of the electronic device has changed by adding or removing a sub-module.

Other advantages of the present invention are addressed in connection with the detailed embodiments.

For a more complete description of the present invention and for further objects and advantages thereof, reference is made to the following description, taken in conjunction with the accompanying drawings, in which.

The expression electronic device in the present context is meant to include devices such as: personal digital assistants (PDAs), cellular phones, computing terminals, handheld computers, cameras, multi-media devices, consumer devices, DECT devices, etc. This listing is not meant to be exhaustive.

Examples of sub-modules are: a GSM/UMTS modem, a MP3 player, a FM radio, a PDA, a color display, a keyboard, etc. This listing is not meant to be exhaustive.

Figure 1:
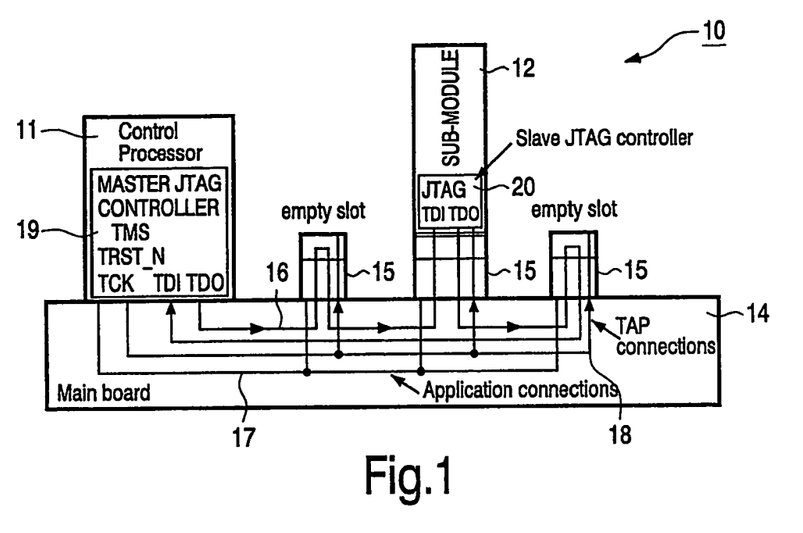
FIG. 1 is a schematic diagram of an electronic device, according to the present invention, comprising one sub-module and two empty slots.
Figure 2:
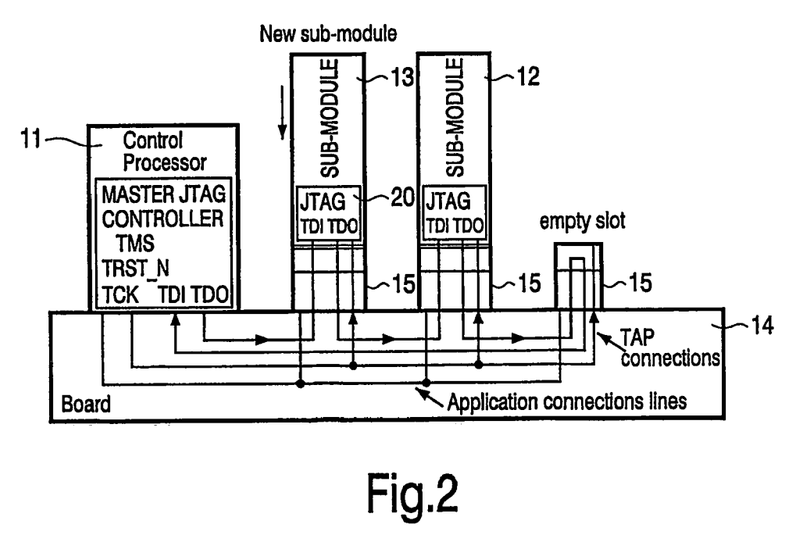
FIG. 2 is a schematic diagram of an electronic device, according to the present invention, comprising two sub-modules and one empty slot.

An electronic device 10 in accordance with the present invention comprises a main control processor 11 and several attachable/detachable sub-modules 12, 13, as illustrated in FIGS. 1 and 2. The main board 14 of the electronic device 10 comprises connectors 15, or the like, which allow the sub-modules 12, 13 to be attached and detached. There is a bus structure and a number of interconnections which interconnect the connectors 15 with the control processor 11. In the present embodiment, there is a loop interconnection 16 which forms a closed loop serially connecting the TDI and TDO data pins, as dedicated by the JTAG standard. In case of an empty slot (a slot where no sub-module is plugged in) the loop is closed by connecting the TDI data pin and the TDO data pin. In addition to these two pins, the connectors 15 may comprise pins that are used by the application (called application connections 17) that runs on the electronic device 10, and it may comprise TAP pins and a TAP connection 18, as defined be the JTAG standard.

The system hardware configuration may be modified by the user depending on the desired application by insertion of a new sub-module either before power-on or when the application is running. In FIG. 1, the electronic device 10 is shown in a configuration comprising just one sub-module 12. There are two empty slots where the TDO and TDI pins are serially connected. In FIG. 2, the same electronic device 10 is shown. A second sub-module 13 has been attached. The control processor 11 running the main application of the electronic device 10 is able to detect this modification of the system configuration on the fly. Sub-modules can be inserted in the connectors to modify the configuration of the system. The control processor 11 could support the main application hardware and software, for example a phone application or a PDA application. The control processor 11 features a master JTAG controller 19 which can access serially the slave JTAG 20 of each sub-module 12, 13. It detects the presence and the type of sub-module 12, 13 connected and adapts the application software accordingly. The sub-modules 12, 13 comprise, in addition to the slave JTAG controller 20, application specific hardware and software (not illustrated in FIGS. 1 and 2).

According to the present invention, the standard JTAG protocol is used to detect in real-time the connection and disconnection of sub-modules 12, 13 and to read and write some parameters on each sub-module 12, 13.

In the present embodiment, the connectors 15 are JTAG connectors feature at least 4 pins compatible with the Test Access Port (TAP) pins: TMS, TDI, TDO, TCLK, plus TRST_N as optional pin. Other pins may be used by the application for example: data and address busses for a memory or data and control bus for a keyboard. The JTAG connectors 15 are linked serially on the main board 14. When a connector 15 is not used, the pins TDI and TDO are shorted mechanically or electronically. When a sub-module is inserted the pins TDI, TDO are connected to the respective pins of the slave JTAG controller 20. The lines TCK, TMS, TRST_N are common to all sub-modules 12, 13. The TRST_N pin can be removed as the JTAG standard supports an other way to reset the slave JTAG controllers 20.

Figure 3:
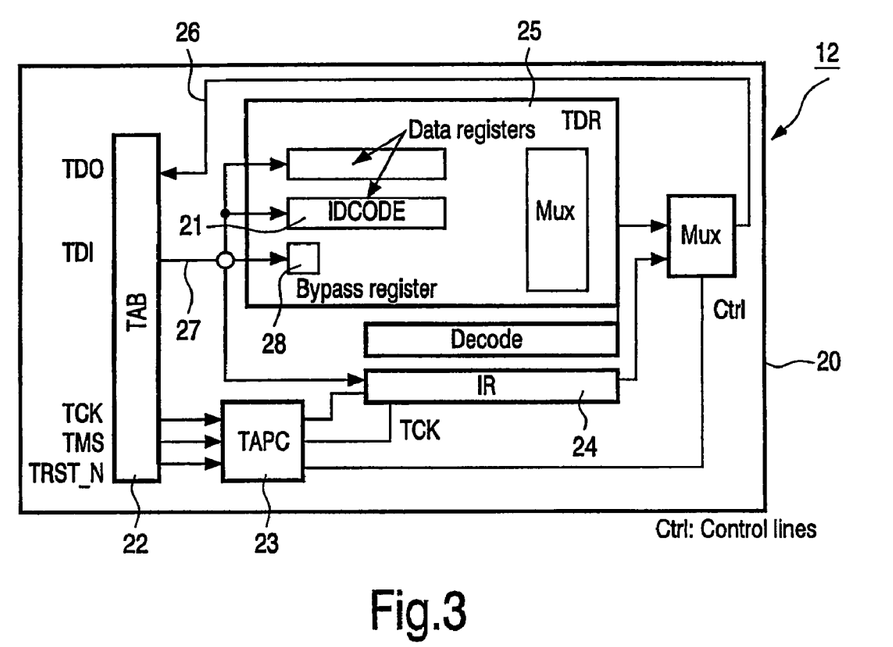
FIG. 3 is a schematic block diagram of a JTAG slave used in sub-module, according to the present invention.

An example of a sub-module 12 is illustrated in FIG. 3. Each sub-module has a specific (preferably a unique) identifier IDCODE that is stored in a data register 21. This identifier coded on 32 bits may be compatible with the JTAG standard. It might contain a version number and other parameters used by the application, which can be read through the TAP connector 15. In this way the control processor 11 is able to detect which sub-module is connected to the electronic device 10, by scanning-in as many bits as necessary until a known identifier IDCODE is detected. The same concept is usually applied to test boards with an external test equipment when checking whether all components are present and of the correct type.

The sub-modules are equipped with a standard JTAG controller 20 implemented either as a stand-alone chip on the sub-module 12 or integrated in a chip of the sub-module 12.

The slave JTAG controller 20 is based on the Join Test Action Group (JTAG) standard. A detailed description of the JTAG standard can be found in IEEE Standard Test Access Port and Boundary-Scan Architecture, IEEE Standard 1149.1-1990. The JTAG hardware comprises a Test Access Port (TAP) 22, a TAP controller (TAPC) 23 which interprets the commands sent to the JTAG sub-module 12, an instruction register (IR) 24, and a group of Test Data Registers (TDRs) 25. The IDCODE is stored in one of the TDRs 25, namely in the register 21. All registers can be captured in a shift register and shifted out to the TDO port 26, or updated from the value shifted-in from the TDI port 27.

In the present embodiment, the TAP 22 comprises the pins:
TCK (Test clock): JTAG clock running in the range of 20 MHz and independent from the application clocks.
TDI (Test Data Input) 27: Serial input in the JTAG controller 20, sampled on the rising edge of TCK.
TDO (Test Data Output) 26: Serial output of the JTAG controller 20, triggered on the falling edge of TCK.
TMS (Test Mode Select) 28: Used to control the TAPC 23, sampled on the rising edge of TCK.
TRST_N (Test Reset): Optional asynchronous reset of TAPC 23.

Figure 4:
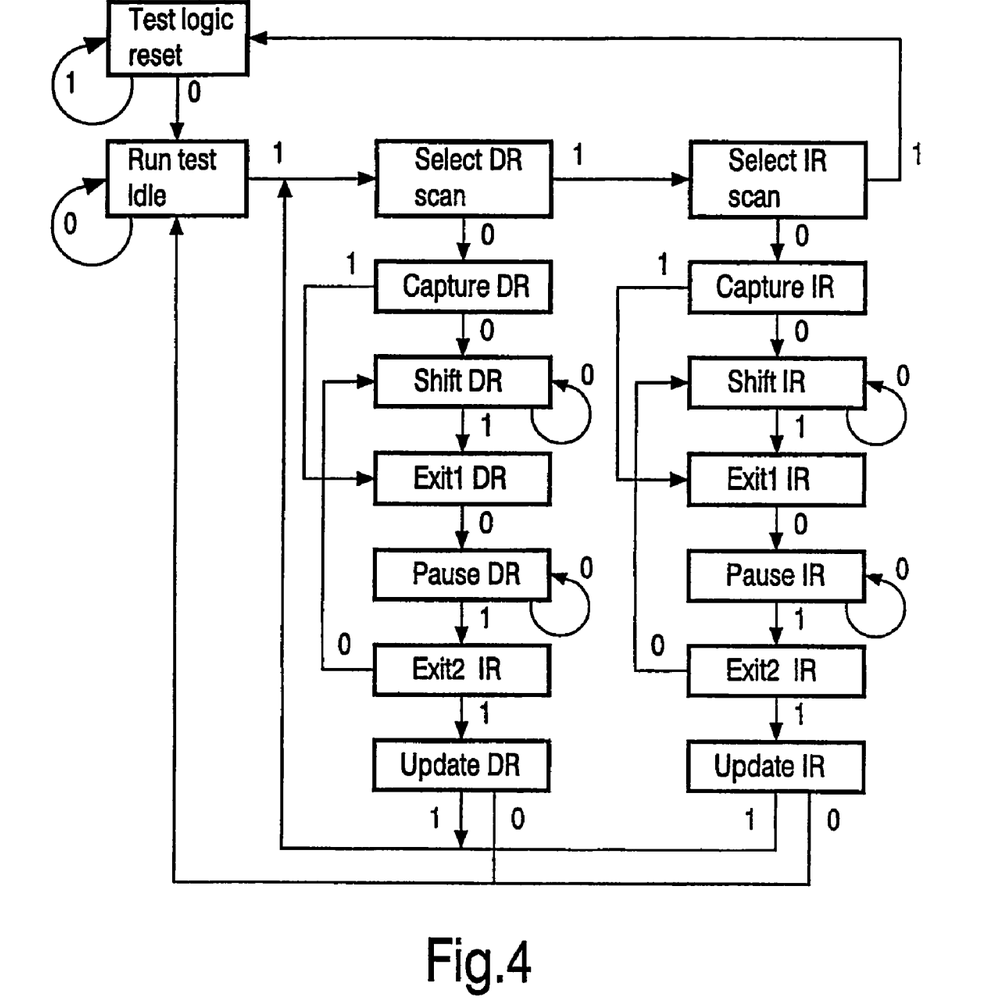
FIG. 4 is a schematic representation of a state machine as used in the control processor of a slave processor, according to the present invention.

Preferably, the TAP controller 23 follows the operation of the following standard Finite State Machine (FSM) illustrated in FIG. 4, whereby all transitions are controlled by the state of the TMS input 28 The following expressions are used in FIG. 4:
Capture: Copy register in a shift register;
Update: Copy shift register to register;
An instruction stays active until the Update_IR state is reached again.

A more detailed description of the state machine can be found in the above-mentioned IEEE standard and in the U.S. Pat. No. 6,000,051, which are both incorporated by reference.

The TAP controller 23 updates the instruction register IR 24. The respective instruction is then executed and can initiate a standard test procedure or connects some Data Register TDR 25 between TDI input 27 and TDO output 26, which will be scanned-in or scanned-out via the loop 16 and the control processor 11.

The standard JTAG instructions are:
INTEST: Used for test
EXTEST: Used for test
SAMPLE/PRELOAD: Used for test
BYPASS (IR register 24 at all set to logic "1"): This instruction connects the BYPASS register 28 between TDI 27 and TDO 26.
IDCODE: This instruction connects the Identification Code of the sub-module 12 between TDI 26 and TDO 27.

In order to simplify the implementation, it is preferable to have the following restriction: All sub-module JTAG instruction registers have the same length of Ninstr_length bits (for example 6 bits) thus being able to code Ninstr_length to the power 2 instructions. In a simple scheme each instruction (except the standard ones) can address one of the special TDR registers 25 included in each sub-module 12, 13. A scheme with instruction registers of different length can be developed but will make the configuration detection more complex. For the present embodiment of the invention some application data registers TDR 25 are initialized at reset or during operation with parameters of the sub-modules 12, 13 to be read by the control processor 11. The same or other registers can be written, to set configuration parameters of the sub-modules 12, 13. To access these data registers 25, new application specific instructions are added to the standard ones, like for example:
CONFIG_REGx: Connect register REGx of current sub-module between TDI 27 and TDO 26. Capture, Shift and Update actions can be executed.

Figure 5:
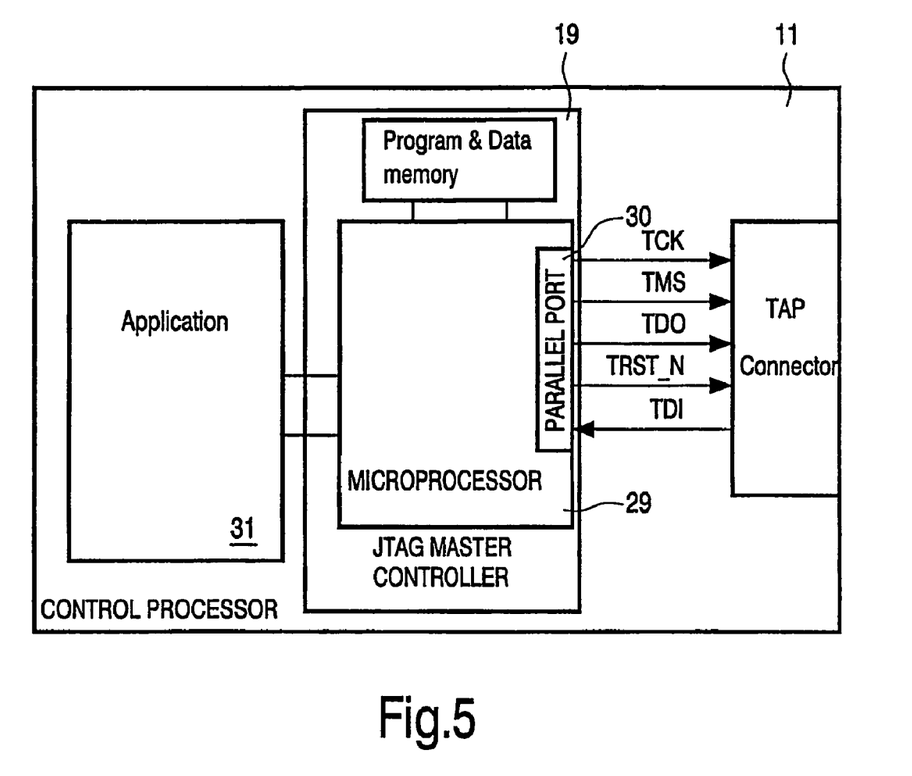
FIG. 5 is a schematic block diagram of control processor implemented with a microprocessor, according to the present invention.

According to the present invention, the control processor 11 is equipped with a specific master JTAG controller 19, as illustrated in FIG. 5, which monitors the slave JTAG controllers 20 of the sub-modules 12, 13. In a standard JTAG testing environment (as specified by the IEEE standard) this function is done by the test equipment. The master JTAG controller 19 can be implemented in software running on a microprocessor or in hardware as explained below.

In FIG. 5, a microprocessor implementation of the master JTAG controller 19 is given. The master JTAG controller 19 is implemented completely by a software running on a microprocessor 29 equipped with a parallel port 30 able to drive TDO, TMS, TRST_N and input the TDI input. The microprocessor 29 could be the same as the one used to run the main application 31 of the electronic device 10, for example the phone application for a cellular phone.

The software running on the microprocessor 29 receives commands with parameters from the main application 31 and returns the system configuration with parameters coming from the sub-modules 12, 13. A detailed description of the operations are given in the next chapter. The microprocessor 29 generates all the waveforms of the signals TCK, TMS, TDO, TRST_N and samples the state of the input TDI according to the JTAG protocol for a master (inverted binary polarity compared to the slave):

TDO is triggered on the falling edge of TCK.
TMS is triggered on the falling edge of TCK.
TDI is sampled on the rising edge of TCK.

Figure 6:
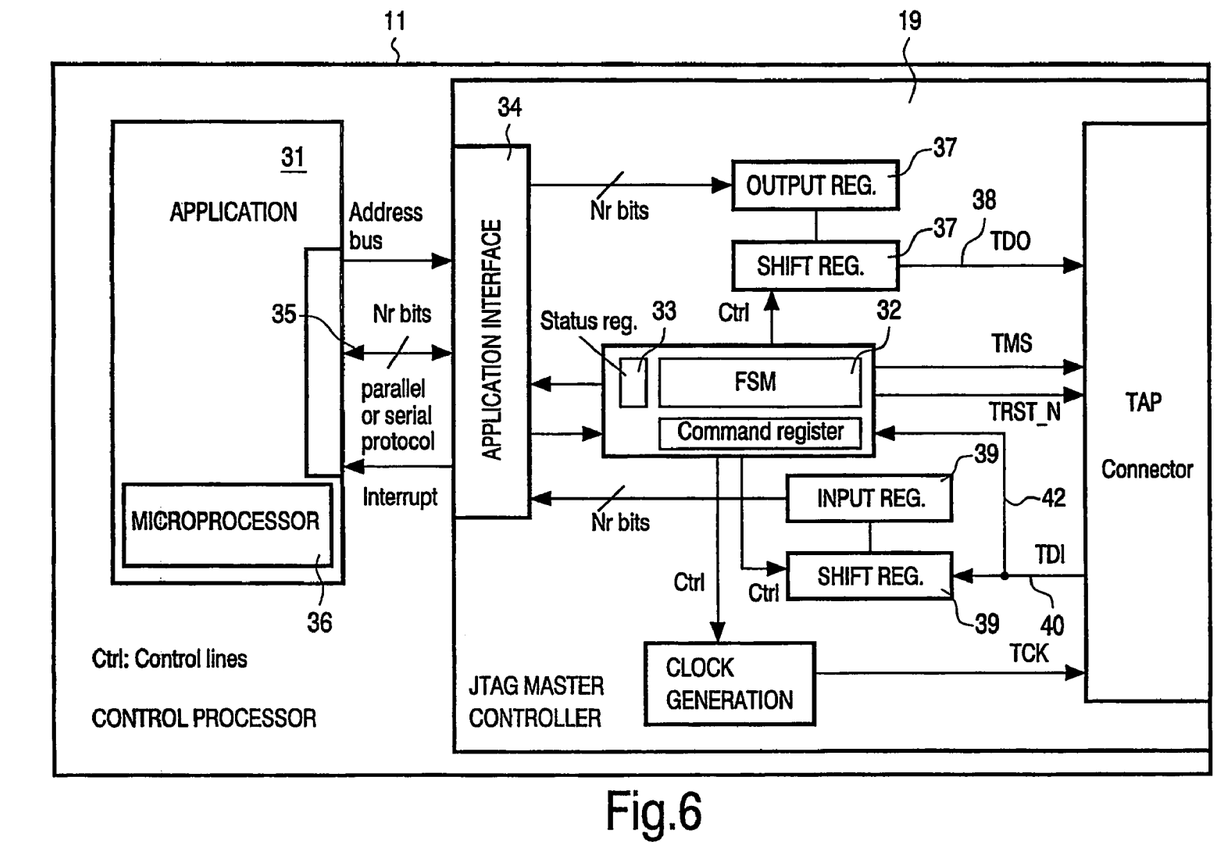
FIG. 6 is a schematic block diagram of control processor implemented with dedicated hardware, according to the present invention.

Alternatively the JTAG master controller 19 may be implemented completely in hardware, as illustrated in FIG. 6. One possible block diagram of such a hardware implementation is given in FIG. 6. The JTAG master controller 19 comprises:

A central Finite State Machine 32: It receives commands from the application 31 and controls the JTAG lines. It returns a status word to the application 31 through a status register 33 which can be polled by software or by activation of an interrupt.

An application interface 34: It allows the application 31 to control the FSM 32 and read/write the input, output registers through a parallel bus 35. The number of bits Nr is preferably the same as the word length of the microprocessor 36 for example 32 bits like the IDCODE length. A serial access is also possible for example by a Philips IIC interface, UART or any other standard serial interfaces. The microprocessor 36 may be the CPU (central processing unit of the electronic device 11, for example).

Output and shift registers 37: The application 31 loads words to the output register 37 which is shifted-out to the TDO pin 38 under the control of the FSM 32. The data are shifted via the TDO pin 38 out into a JTAG slave 20.

Input and shift registers 39: The application 31 can read words shifted-in from the TDI pin 40 under the control of the FSM 32. I.e., data from a JTAG slave 20 are received via the TDI pin 40. The data can either be read directly by the state machine 32 (this is done via the interconnection 42), or the data can be read via the shift registers 39.

All blocks are clocked by a clock of double frequency compared with TCK as events should be triggered and others sampled on both edges of TCK. The timing of the JTAG pins are according to the JTAG protocol for a master as explained in the above-mentioned references.

In the following section, the operation of the master 19 and slave JTAG controllers 20 is described. This section gives a more detailed information on the operation of these controllers 19 and 20.

The operations performed by the master JTAG controller 19 are:

Reset of the slave JTAG controllers 20: At power-up and during the execution of the application the slave JTAG controllers 20 will be reset. The reset of all slaves is performed either by activating the pin TRST_N or by pulling TMS constantly high and clocking TCK according to the JTAG protocol. If during operation, the system configuration is undefined it is necessary to perform a reset of the slaves. This reset does not affect the application specific Data Registers.

Check system configuration: The master controller 19 will scan-out JTAG commands to detect the number of sub-modules 12, 13 connected and find out their identity codes (identification information). The configuration is returned to the main application 31 in a list of parameters, for example. The master controller 19 will also learn on which connector which sub-module 12, 13 is connected. The check should be repeated at least twice to be sure that transient values have not been recorded due to plugging, un-plugging of sub-modules 12, 13. This operation should be repeated, preferably continuously at regular interval (for example 2 seconds), during the execution of the application 31 to detect modification of the configuration (removal of sub-modules, addition of sub-modules). According to the JTAG protocol, after reset the IDCODE of each slave is loaded in their instruction registers 24. By driving all slave TAPC controllers 20 in the state Shift_IR it is possible to scan-in into the master controller 19 the IDCODEs of all sub-modules 12, 13. A specific binary pattern called START can be shifted-out from the master 19. The shift operation is repeated until the START pattern is detected in the master input shift register 39. It is possible to determine the number of sub-modules (Nmodules) and their position along the scan chain.

Read or write parameters of sub-modules: The master JTAG controller 19 accesses with dedicated JTAG instructions the TDR of a defined sub-module 12 or 13. To read the Data Register 25 of a specific sub-module 12 it is sufficient to set the other sub-module 13 in Bypass mode with the Bypass instruction and load the specific module 12 with the read instruction of this register. Then the master JTAG controller 19 drives all slave controllers 20 to the state Shift_DR and shifts-out the data register. The length of the sequence is known as each bypass register is only 1 bit and the length of the DR register is deduced from the IDCODE knowledge. Several module parameters could be read in the same shift sequence. The write operation is performed by shift-in a sequence and driving the slaves to Update_DR state. Also in this case several parameters in different modules can be written in the same shift sequence. Read and write operation can also be done in the same shift sequence as first the slave FSM go to Capture_LDR, the shift takes place and then the Update_DR is performed.

Check write operation of sub-module: After writing to a sub-module 12 or 13, it is important to check that the sub-module 12 or 13 has not been removed in the meantime. In order to do this, the check configuration is restarted or a read to the same register is performed, for example.

When the control processor 11 detects that a new sub-module 12 or 13 has been inserted, it will modify dynamically the parameters of the application software 31. For example if a keyboard is connected, Email will be entered through this keyboard and not through the phone keyboard. If a large color display is plugged-in, the graphic are redirected to this display adjusting the picture resolution. All these configuration modifications are transparent to the user and do not require any sub-module type declaration through the keyboard or rebooting of the electronic device 10.

Figure 7A:
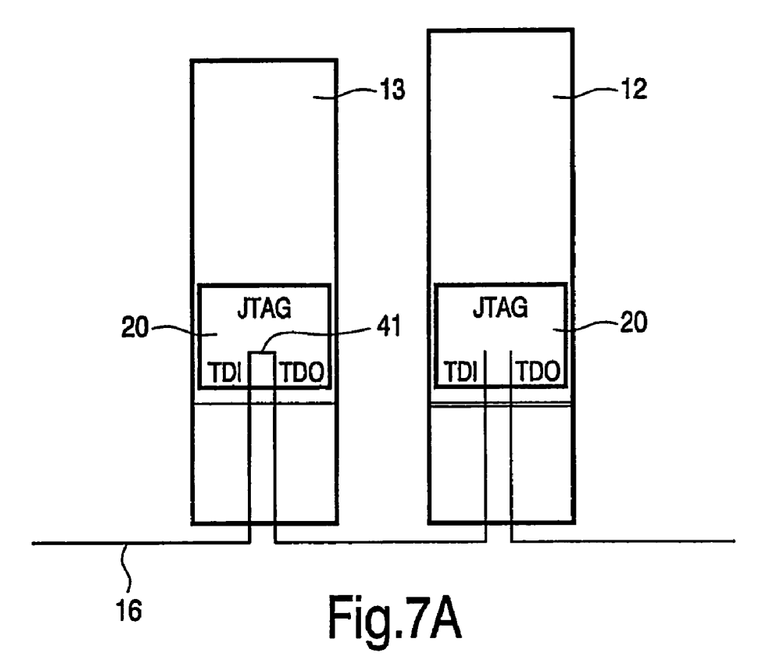
FIG. 7A, 7B is a schematic representation of two steps, according to the present invention.
Figure 7B:
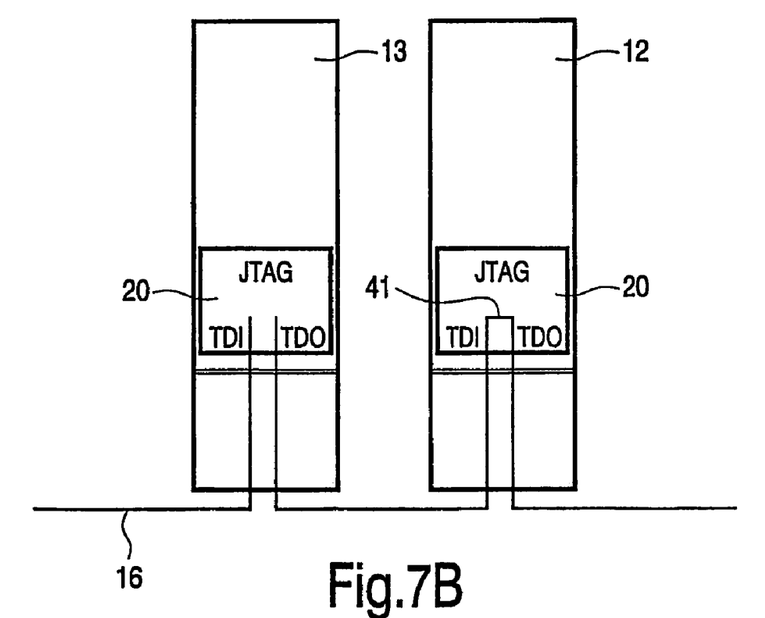

One way of automated on the fly configuration with JTAG is described in connection with FIGS. 7A and 7B. In a first step, the control unit 11 sends a JTAG command to a first sub-module 13, to put the first sub-module 13 in a by-pass mode. In the by-pass mode, the TDI pin and the TDO pin of the respective sub-module are interconnected, as illustrated by the reference number 41. This step is repeated until all other sub-modules, (in the present case there is just one other sub-module 12), except for one sub-module (the sub-module 12 in FIG. 7A) are in a by-pass mode. In other words, the control unit 11 sends a JTAG command to all sub-modules, except for one in order to put all but one sub-module in the by-pass mode. Then, the identification information is read from the one sub-module 12 that is not in the by-pass mode (see FIG. 7A). In a subsequent step, the control unit 11 sends a JTAG command to the one sub-module 12 that is not in the by-pass mode, to put it in a by-pass mode, too. Then, the control unit 11 issues a JTAG command to remove the by-pass mode of one of the other sub-modules. In the present example, the by-pass mode of the sub-module 13 is now removed (see FIG. 7B). The control unit 11 reads identification information from the sub-module 13. If there are more than 2 sub-modules, the above steps are repeated until the identification information of all sub-modules has been read. The control unit can write parameters into one or more of the sub-modules 12, 13 and/or the control unit can read parameters from one or more of the sub-modules 12, 13. Whether this is necessary depends on the kind of sub-module. In order to be able to detect whether the configuration has changed, from time-to-time the configuration is re-checked. If the configuration has changed, the above steps can be repeated. In another embodiment, the above steps are automatically repeated in a certain time interval. This also ensures that configuration changes are detected and dealt with.

According to one embodiment of the invention, the JTAG master controller 19 in a first step determines whether any sub-modules are present and if yes, how many sub-modules are being present It then reads identification information from one sub-module after the other to learn which sub-modules there are. If necessary, the JTAG master controller 19 writes parameters into one or more of the sub-modules to ensure proper interoperation with the electronic device 10.

In another embodiment of the invention, the IDCODE can be read without having to put one particular sub-module in IDCODE mode and the others in the by-pass mode. All sub-modules can receive the IDCODE instruction from the JTAG master and the data shift will read all the available IDCODEs in the same sequence.

The same principle can be applied for writing parameters into sub-modules or for reading parameters from sub-modules, i.e., the same instruction can be sent to all sub-modules and the parameters can be read or written.

In another embodiment, each sub-module is addressed one by one putting all the other sub-modules in the by-pass mode.

In one particular embodiment, the empty slot or bay comprises a switch or similar means that simply connects the TDI and TDO pins when no sub-module is plugged in. Likewise, one can use a jumper that is manually put in place after a sub-module is removed. The jumper connects the TDI and TDO pins.

It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable subcombination.

In the drawings and specification there has been set forth preferred embodiments of the invention and, although specific terms are used, the description thus given uses terminology in a generic and descriptive sense only and not for purposes of limitation.

The invention claimed is:

1. A method, comprising:
   detecting attachment of a newly-attached sub-module to a slot of an electronic device that includes a control unit, configured to run an application program, and a plurality of slots for attaching sub-modules for use with the application;
   automatically configuring the electronic device to operate with the newly-attached sub-module in response to detecting attachment of the newly-attached sub-module, the automatically configuring comprising:
   reading identification information from the newly-attached sub-module by applying a JTAG command from the control unit to the newly-attached sub-module,
   transferring parameters into or from a register of the newly-attached sub-module by applying a JTAG command, specifying the register, from the control unit to the newly-attached sub-module, wherein said parameters are used during operation of the application program in conjunction with the newly-attached sub-module, wherein the reading is carried out by:
   sending from the control unit a JTAG command to a first sub-module, to put the first sub-module in a by-pass mode,
   repeating the previous step until all sub-modules, except for the newly-attached sub-module are in a by-pass mode,
   reading the identification information from the newly-attached sub-module that is not in the by-pass mode,
   sending from the control unit a JTAG command to the newly-attached sub-module that is not in the by-pass mode, to put it in a by-pass mode,
   sending from the control unit a JTAG command to another sub-module to remove the by-pass mode,
   reading identification information from the another sub-module that is not in the by-pass mode, and
   repeating the previous steps until the identification information of all sub-modules has been read.

2. The method of claim 1, further comprising re-checking a configuration of the electronic device from time to time to detect whether the configuration has changed, whereby the re-checking of the configuration is done by reading the parameters after writing them into one or more of the sub-modules.

3. The method of claim 1, further comprising using JTAG commands by the control unit for controlling the sub-modules.

4. The method of claim 3, further comprising issuing a JTAG BYPASS command by the control unit to put the sub-modules in a by-pass mode.

5. The method of claim 2, further comprising issuing a JTAG IDCODE command by the control unit to read the identification information from a sub-module that is not in a by-pass mode.

6. The method of claim 1, further comprising modifying operation of the application responsive to detecting that the configuration has changed.

7. The method of claim 1, wherein rechecking the configuration is performed while running the application.

* * * * *